United States Patent [19]
Badger et al.

[11] Patent Number: 5,299,172
[45] Date of Patent: Mar. 29, 1994

[54] METHOD FOR ADJUSTING CRYSTAL HYDROPHONE OUTPUT

[75] Inventors: Algernon S. Badger, East Bernard; Gary J. Craig, Houston, both of Tex.

[73] Assignee: Halliburton Geophysical Services, Inc., Houston, Tex.

[21] Appl. No.: 13,052

[22] Filed: Feb. 3, 1993

[51] Int. Cl.$^5$ .............................. H04B 17/00
[52] U.S. Cl. ............................ 367/13; 367/191; 29/25.35; 29/594; 73/1 DV
[58] Field of Search ............ 29/25.35, 594; 73/1 DV; 367/191, 12, 13

[56] References Cited

U.S. PATENT DOCUMENTS

| | | | |
|---|---|---|---|
| 3,763,530 | 10/1973 | Helfen | 29/25.35 |
| 3,930,216 | 12/1975 | Hall, Jr. | 29/593 |
| 4,055,878 | 11/1977 | Radice | 29/25.35 |
| 4,356,424 | 10/1982 | Marcus | 310/357 |
| 4,459,634 | 7/1984 | Stefanou | 29/25.35 |

Primary Examiner—J. Woodrow Eldred
Attorney, Agent, or Firm—Arnold, White & Durkee

[57] ABSTRACT

A method for precisely adjusting the sensitivity of a polarized crystal hydrophone by applying a voltage signal to the hydrophone. Voltage pulses having selected characteristics are repeatedly applied to the crystal until it is determined that the sensitivity of the crystal has reached a desired level.

25 Claims, 7 Drawing Sheets

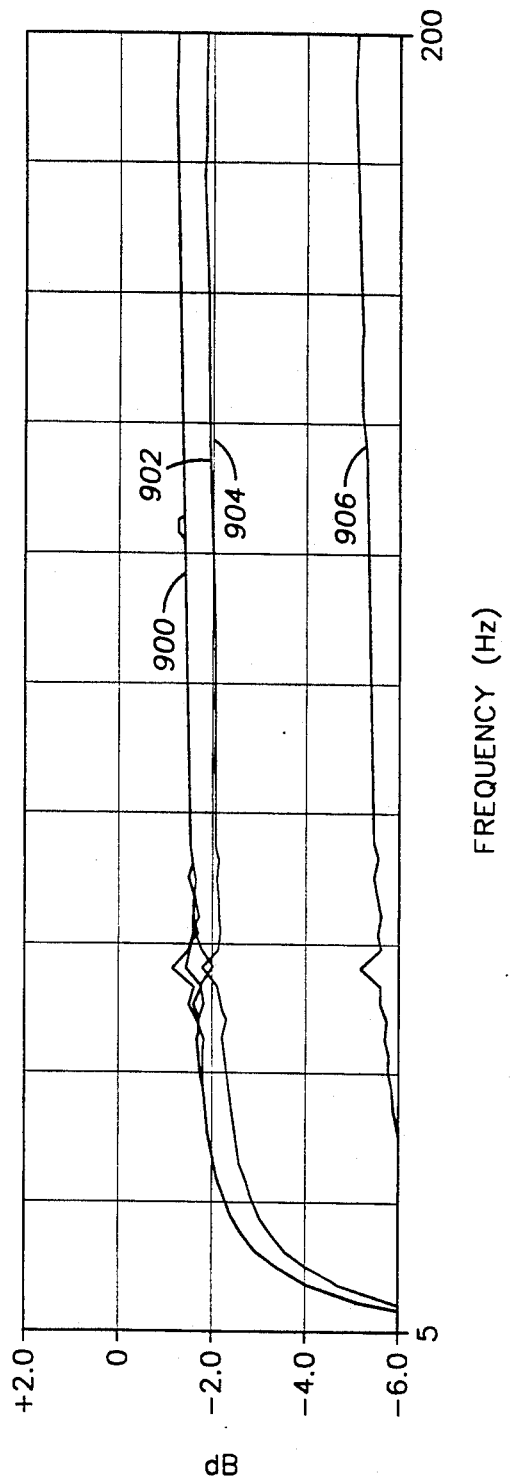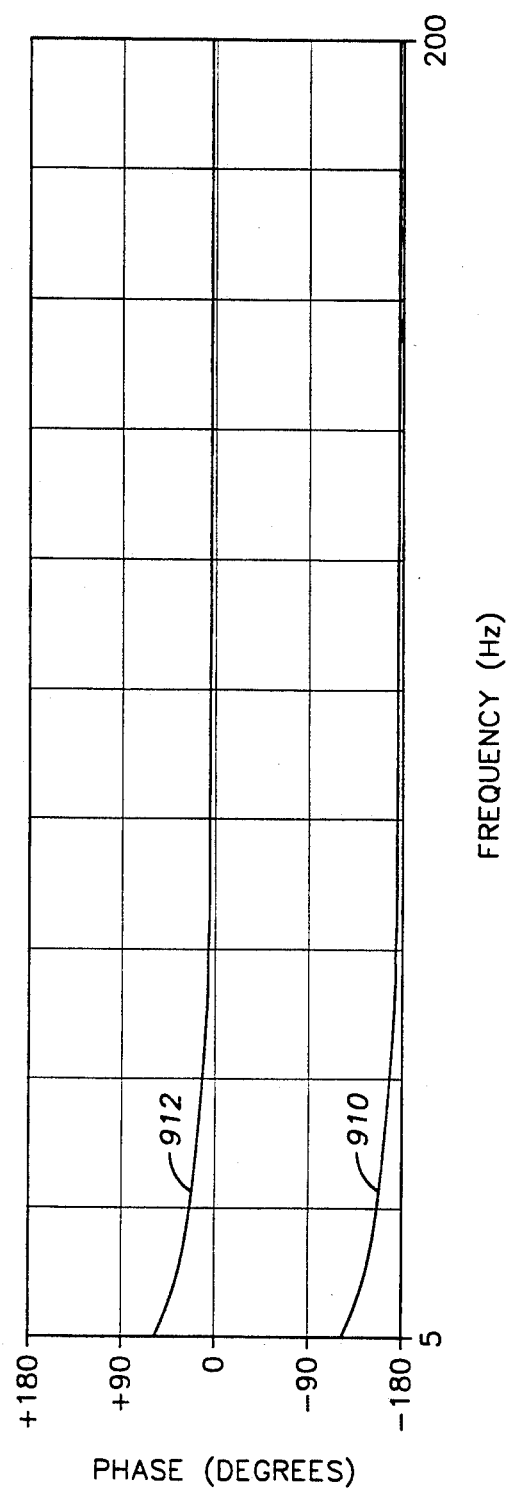
FIG. 9A
FIG. 9B

METHOD FOR ADJUSTING CRYSTAL HYDROPHONE OUTPUT

BACKGROUND OF THE INVENTION

1. Field of Invention

The present invention relates to seismic measuring equipment. More particularly, the invention relates to a method for precisely adjusting the sensitivity of a polarized crystal hydrophone.

2. Description of Related Art

Due to the increasing difficulty and cost of finding petroleum resources in the world today, exploration techniques are becoming more and more technologically sophisticated. For example, many have found crystal hydrophones to be useful in petroleum exploration. Basically, hydrophones are used to measure seismic waves created by a source such as an air gun or a dynamite charge, to obtain detailed information about various sub-surface strata of earth.

As shown in FIG. 1, a typical crystal hydrophone 100 includes a diaphragm 102, a crystal 104, and a housing 106 that is typically filled with a gas 107. The diaphragm 102, which has front and rear sides 102a, 102b, is made from a material such as Kovar ™ or a Berylium Copper compound, and is electrically connected to the crystal by a conductive epoxy 108. The crystal 104 is made from a material such as Lead Zirconium Titanate, and is silver-plated on its top 104a and bottom 104b to achieve better conductivity. The crystal 104 is initially polarized by applying a high-voltage electrical charge to the crystal 104. When the polarized crystal 104 experiences pressure resulting from a physical input, such as sound, fluid pressure, or another type of pressure, it produces a voltage representative of the pressure experienced. The crystal 104 is electrically connected to electrical output leads 110, 112. To protect the crystal 104 from contaminants, and to maintain the crystal 104 in atmospheric pressure, the crystal 104 and the rear side 102b of the diaphragm 102 are sealed within the gas-filled housing 106. The housing 106 protects the crystal 104 and diaphragm 102, and facilitates mounting of the hydrophone 100.

The diaphragm 102 functions to vibrate in response to physical pressures it experiences. The physical deflection of the diaphragm 102 is transferred by the epoxy 108 to the crystal 104, which deforms the electron structure of the crystal 104, causing an electrical potential to be provided across the leads 110, 112.

As mentioned above, hydrophones are often used in petroleum exploration in conjunction with seismic equipment. In one example of such an application (FIG. 2), a streamer 200 and a seismic source 202 are towed behind a ship 204. The streamer 200 is made up of many adjacent hydrophone "arrays" (not shown), where each array includes a plurality of hydrophones. All hydrophones of a single array are positioned on the same axis, so that all hydrophones respond similarly to a given pressure input. An exemplary hydrophone array may contain 16 hydrophones. The seismic source 202 is typically an air gun, a dynamite charge, or the like.

During operation of the system of FIG. 2, the seismic source 202 produces a large explosion. Seismic waves from the explosion travel through water 206, are refracted through various layers of earth 208, and are reflected back to the streamer 200, which senses the disturbances that it experiences and conveys them to the ship, where they a.e recorded by recording equipment 210. By studying these records, analysts can determine the makeup of the earth 208.

One analysis technique, called "amplitude versus offset," is based upon the fact that seismic waves have a different reflection coefficient for layered, non-isotropic rock at shallow angles than for homogeneous consolidated material. This is illustrated in FIG. 3, wherein the reflection coefficient ($R_c$) versus angle of entry ($\Theta$) curves are compared for a non-isotropic rock formation (curve 312) and a homogeneous formation (curve 314). The curves 312, 314 can be readily distinguished since, at a 45° angle of incidence, the reflection coefficients of the curves 312, 314 vary by 12–15%. Accordingly, for a seismic wave, such as the wave 212, a wave reflected from a formation will probably be detected by the hydrophones near a region 214 of the streamer; with similar amplitudes for homogeneous and non-isotropic formations, while a seismic wave 215 detected by the hydrophones near a region 216 will have different amplitudes dependent on the formation lithology. In a manner that is beyond the scope of this disclosure, but well-known to ordinary skilled seismic geologists, a mathematical equation can be generated to represent the magnitude of the reflected signals received by the hydrophones of the streamer 200 as a function of their position in the streamer 200, the composition of the earth 208, the depth of the water 208, and other relevant factors. However, for such an equation to be useful and accurate, the sensitivities of the hydrophones must be uniform along the entire length of the streamer 200.

Having hydrophones of uniform sensitivity is also critical in calibrating the hydrophone arrays. In land-based operations, a geophone array may be easily calibrated with computer analysis data, since the positions of the seismic source and the array are fixed with respect to the earth. However, calibrating a hydrophone streamer 200 is more difficult since both the source 202 and the streamer 200 are moving simultaneously with respect to the earth. Therefore, if the hydrophones of a streamer 200 vary in sensitivity, the hydrophones cannot be computer-calibrated as effectively as desired, and data from the hydrophones is likely to contain errors There are a number of techniques currently being used to help ensure hydrophone homogeneity. One method is to simply select or purchase hydrophones having a desired sensitivity. Usually, hydrophone manufacturers test their hydrophones to determine their sensitivities, and then sort the hydrophones into groups of similar sensitivities. Specifically, a nominal or average sensitivity is defined in volts output per unit of pressure input, and the hydrophones are sorted by their variance from the nominal value, e.g. +10%, +5%, −5%, −10%, etc. In a typical hydrophone batch, there is usually a maximum variation in sensitivity of ±20% from the average value. Therefore, the hydrophone purchaser may elect to purchase hydrophones of a single level, or purchase a batch of hydrophones and discard hydrophones that do not display the desired sensitivity. Discarding non-conforming hydrophones results in a great deal of wa e, and is grossly cost inefficient.

Therefore, many use a second approach to obtain hydrophones of uniform sensitivity. This method uses a circuit 400 employing a capacitive divider (FIG. 4). Under this approach, a hydrophone array 402 is modeled as a power source 408, since the array 402 produces voltage in response to pressure, and an array capacitor 410, to represent the capacitance of the array 402. Under this approach, the output of a hydrophone 402 is electrically connected to a matching capacitor 404. The output across the matching capacitor 404 and hydrophone 402 is measured at a pair of terminals 412, 414 by signal-measuring equipment 405. The equipment 405 is modeled as a load capacitor 406. Since the capacitance 406 of the equipment is fixed, the voltage output at the terminals 412, 414 can be adjusted by changing the capacitance of the matching capacitor 404. Accordingly, the effective pressure sensitivity of the circuit 400 may be designated by either selecting an appropriate matching capacitor, or by utilizing an adjustable matching capacitor.

Although this method is useful for some applications, it is limited from the standpoint of accuracy. In particular, even when this method is used to normalize the outputs of multiple hydrophone arrays, the outputs of the arrays will still diverge by about ±5%, due to variations in the capacitances of the matching capacitors 404. This amount of inaccuracy is sometimes unacceptable, since some applications require accuracy of ±2% or ±1%. Even if more accurate capacitors can be found, this method is still limited from the standpoint of labor and cost, since a typical streamer 200 contains thousands of hydrophones, each of which may require a different capacitive adjustment. Moreover, the use of adjustable capacitors may be undesirable, since adjustable capacitors can introduce unwanted noise into the circuit.

BRIEF SUMMARY OF INVENTION

The present invention is directed at the problems set forth above. The invention concerns a method for precisely adjusting the sensitivity of a polarized crystal hydrophone by applying one or more voltage pulses to the crystal. First, a standard physical input signal such as a sound wave or another vibratory pressure disturbance is applied to the crystal while the magnitude and phase of the crystal's voltage output are measured. If the hydrophone's sensitivity is not equal to the desired level, a high-voltage pulse, opposite in polarity to the polarization of the crystal, is applied to the crystal, causing the crystal's polarization to weaken. This decreases the crystal's pressure sensitivity, e.g., volts output per unit of pressure input. The sensitivity is measured again. If the crystal's sensitivity has not reached the desired level, the magnitude and pulsewidth of the next high-voltage pulse are selected, and the selected pulse is applied to the crystal, thereby further reducing the crystal's sensitivity. The crystal is repeatedly pulsed and its output measured until the crystal's sensitivity is decreased to the desired level. If the phase of the crystal reverses after application of a voltage pulse, this means that the crystal has been de-polarized. In this case, the crystal is re-polarized using a known method, and the process is restarted.

DESCRIPTION OF DRAWINGS

The nature of the invention, as well as its objects and advantages, will become more apparent to those skilled in the art after considering the following detailed description in connection with the accompanying drawings, in which like reference numerals designate like parts throughout, wherein:

FIG. 9A is a graph depicting a amplitude characteristics of a hydrophone successively pulsed to the point of phase inversion; and FIG. 9B is a graph depicting the phase characteristics of a hydrophone successively pulsed to the point of phase inversion.

DESCRIPTION OF A PREFERRED EMBODIMENT

Figure 1:
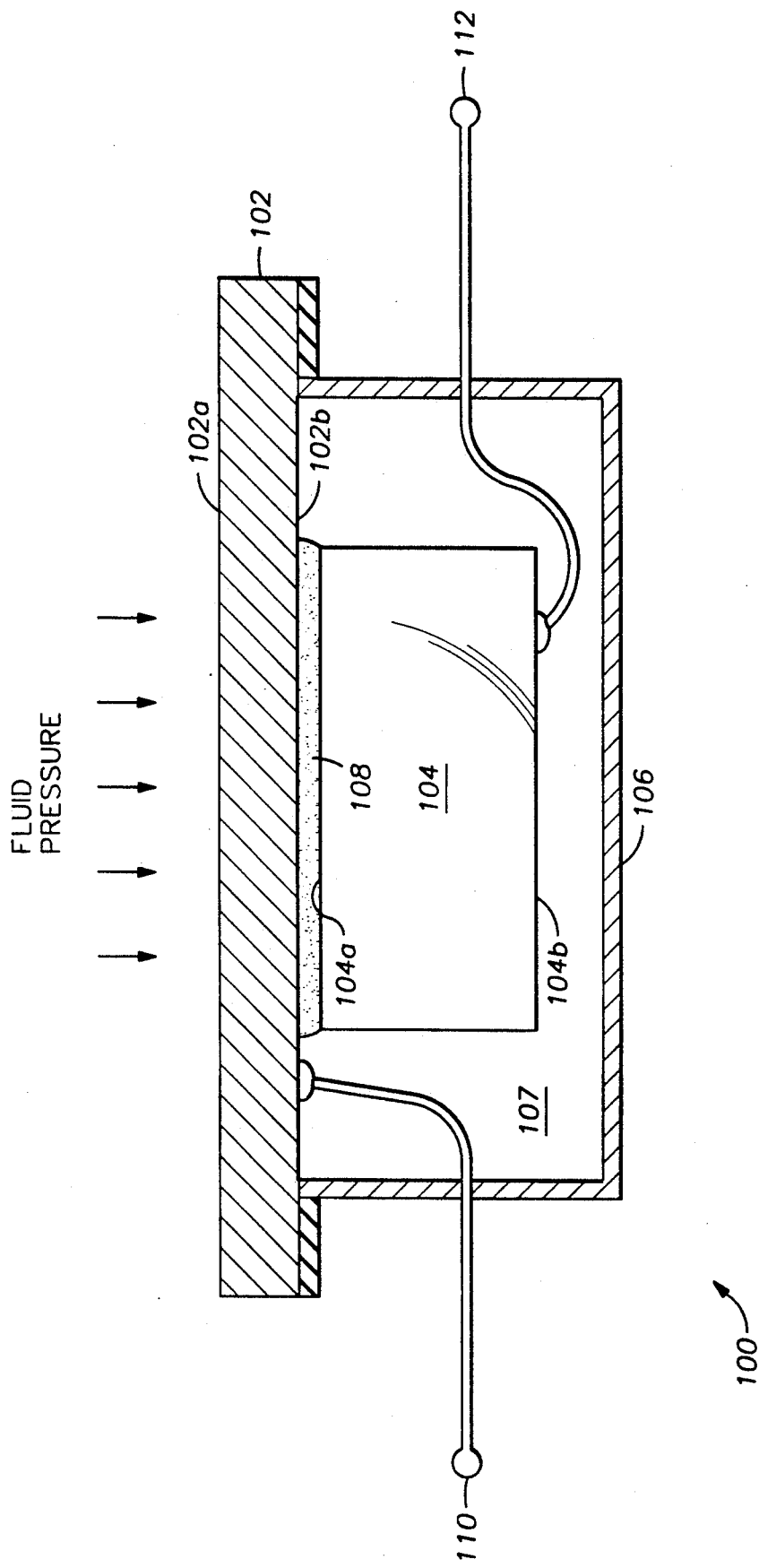
FIG. 1 is a cross-sectional side view of a typical hydrophone.
Figure 2:
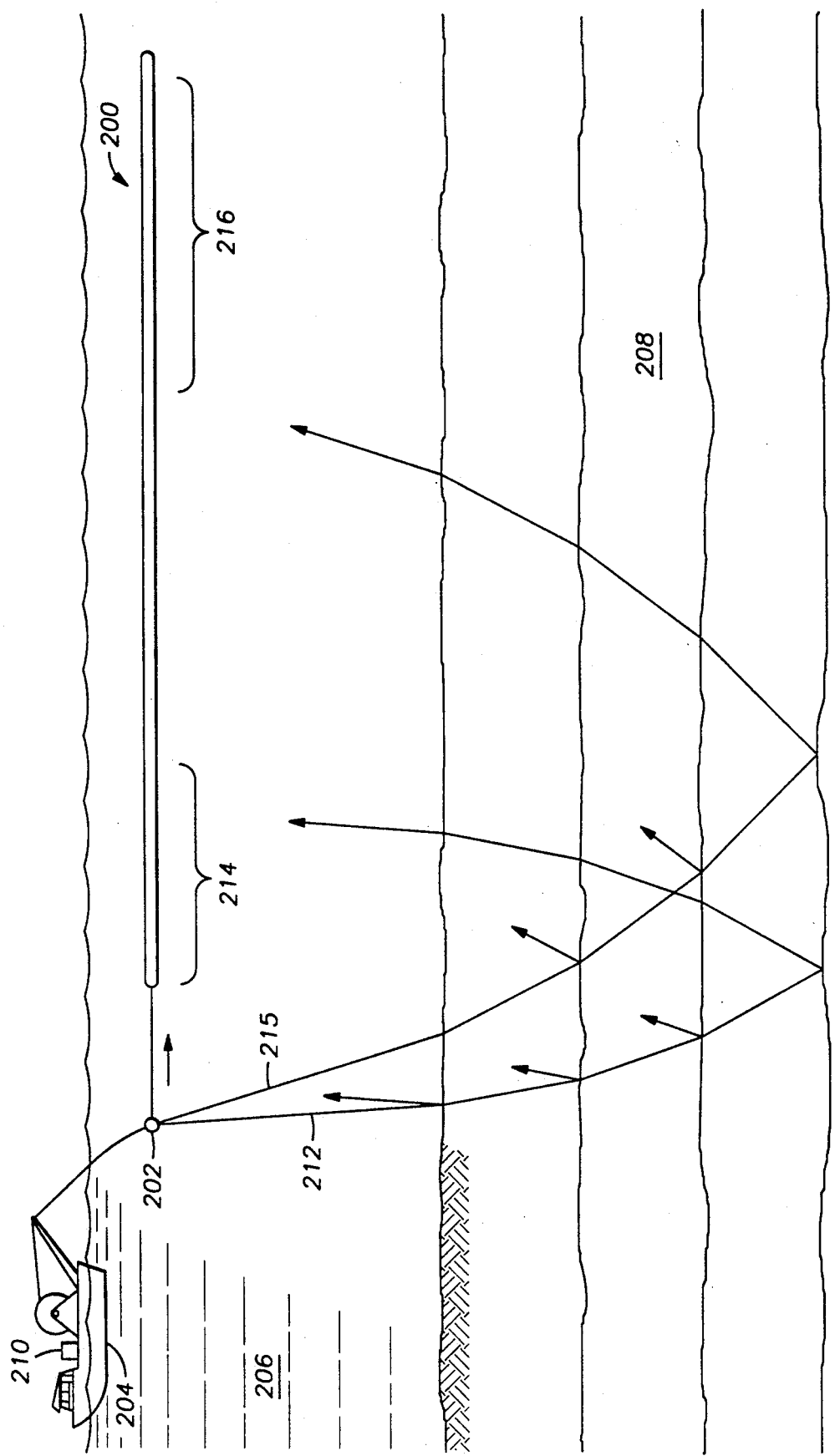
FIG. 2 is a drawing showing a typical application of hydrophones in petroleum exploration.
Figure 4:
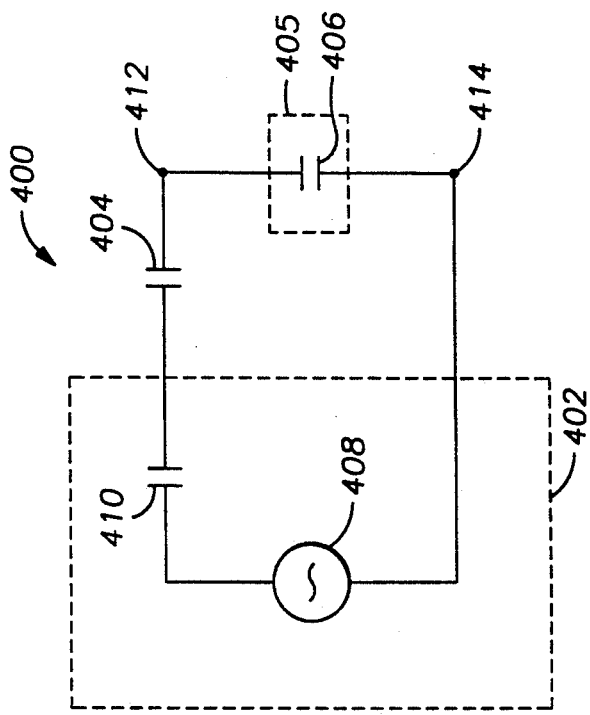
FIG. 4 is an electrical schematic diagram illustrating a known circuit for adjusting the sensitivity of a hydrophone array.
Figure 3:
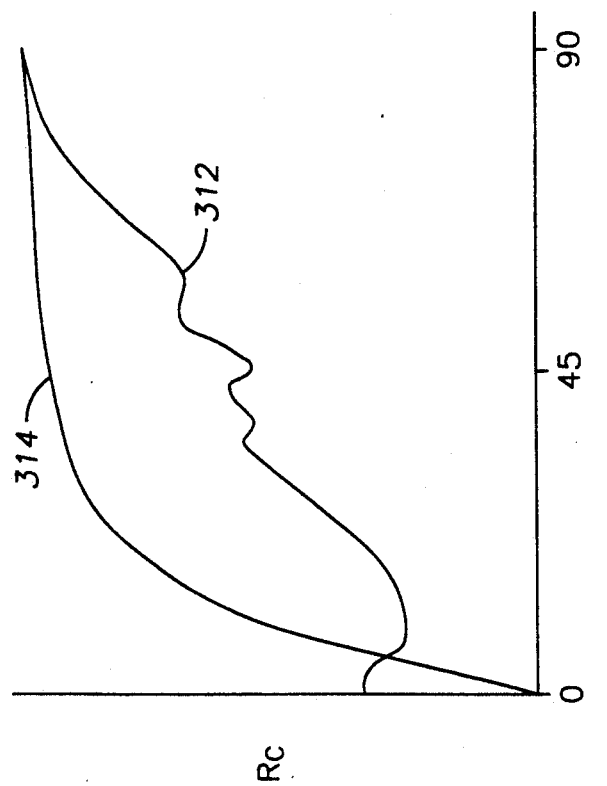
FIG. 3 is a graph contrasting the reflection coefficient of seismic waves for non-isotropic and homogeneous materials, at various angles of incidence.
Figure 5:
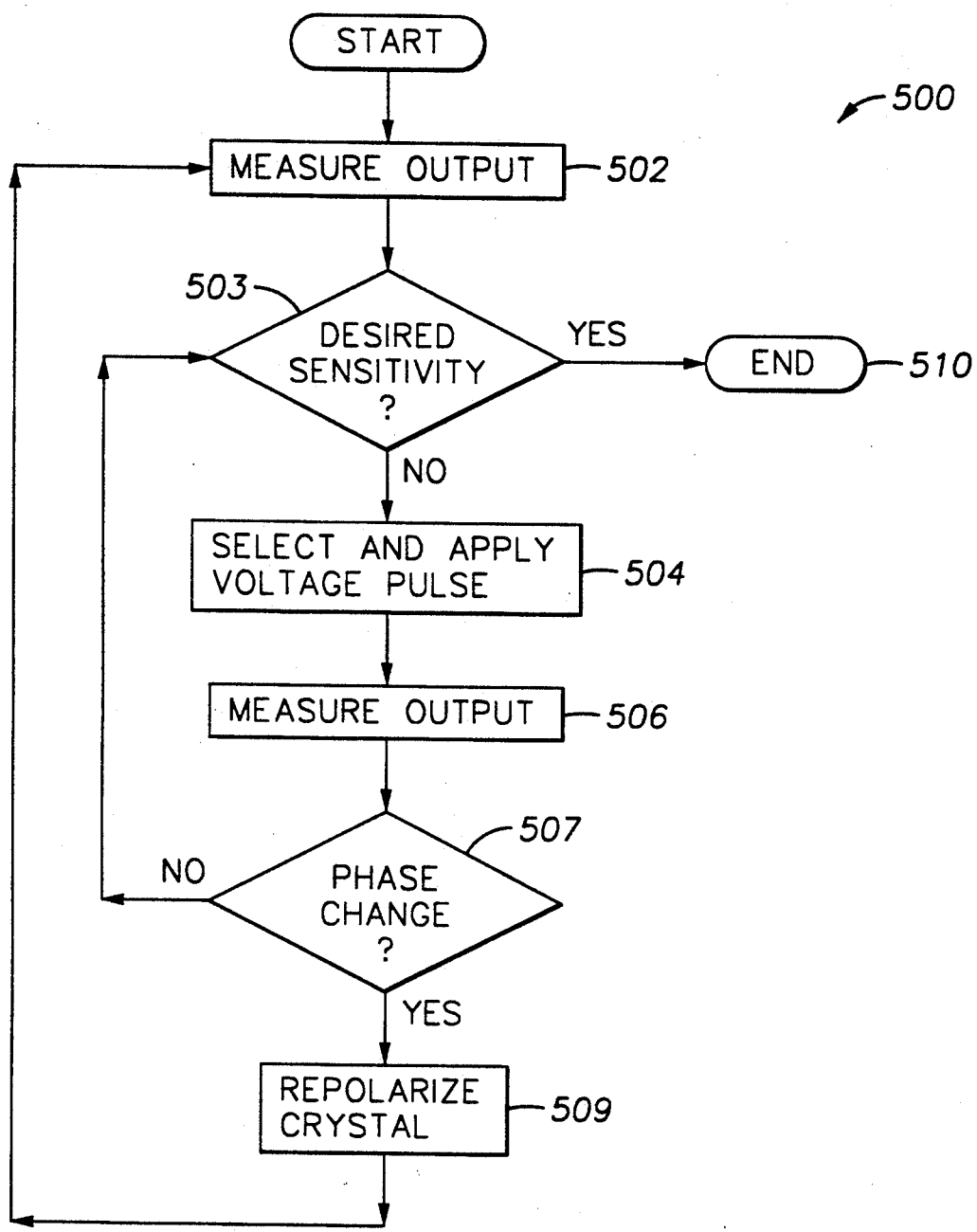
FIG. 5 is a flowchart illustrating a method for adjusting the sensitivity of a hydrophone array in accordance with the present invention.

Referring to FIG. 5, the process of the present invention involves a number of tasks 500, beginning in task 502 wherein a standard pressure input is applied to the polarized hydrophone 100 while measuring the voltage across the leads 110, 112. The pressure input comprises a sound wave or another vibratory pressure disturbance. Then, query 503 asks whether the hydrophone's sensitivity (e.g., volts output per unit of pressure input) is at the desired level. If so, the process ends in task 510. Otherwise, a high-voltage pulse is selected and applied to the hydrophone 100. Preferably, this voltage is applied to the leads 110, 112 in task 504. However, one may alternatively apply this voltage directly across the crystal 104. This high-voltage pulse is opposite in polarity from the polarization of the hydrophone 100, and therefore causes the polarization of the crystal 104 to change. One shape of voltage pulse that has been found to be useful is a rectangular wave. However, triangular, sinusoidal, and other wave shapes are also considered to be useful.

In task 506, the standard pressure input is again applied to the hydrophone 100 while the magnitude and phase of the voltage across the leads 110, 112 are measured. These measurements are made for two reasons. First, if the hydrophone's sensitivity (e.g., volts output per unit of pressure input) has reached the desired magnitude, further high-voltage pulses are unnecessary. Additionally, the measurements of task 506 are useful to determine whether the hydrophone's phase has reversed.

Hydrophones are usually polarized in one of two ways. If polarized in a first manner, applying pressure to the hydrophone will produce a positive voltage at the hydrophone's output leads 110, 112. If the hydrophone is polarized with opposite polarity, the hydrophone will provide a negative voltage across the same output leads when it detects pressure. If the high-voltage pulse of task 504 exceeds the hydrophone's polarization, the hydrophone will lose its polarization. This will be evidenced by a phase reversal, e.g., if the hydrophone previously produced a positive voltage when pressure was applied, then, after de-polarization, the hydrophone will produce a negative voltage when pressure is applied.

If query 507 determines that the phase of the crystal 104 has not reversed, query 503 determines whether the measurement made in task 506 indicates that the sensitivity of the crystal 104 has reached the desired level. If not, the characteristics of another voltage pulse are selected in task 504, and the selected voltage pulse is applied to the leads 110, 112. Such characteristics may include, for example, the pulsewidth and magnitude of the voltage pulse. In a preferred embodiment, the voltage pulse characteristics are chosen to most efficiently achieve the desired level of hydrophone sensitivity. For example, if a large difference still exists between the desired sensitivity of the hydrophone 100 and that measured in task 506, then the width and/or magnitude of the pulse applied in task 504 may be increased accordingly. In contrast, if the difference between the desired hydrophone sensitivity and the measured hydrophone sensitivity is small, then the width and/or magnitude of the pulse applied in task 504 may be reduced proportionally.

Steps 502, 503, 504, 506, 507, and 509 are repeated until query 503 determines that the hydrophone 100 has achieved the desired level of sensitivity, whereupon the process ends in task 510. During this process, however, if query 507 determines that the phase of the crystal 104 has reversed, then the crystal is re-polarized using a known method in task 509, and the routine continues in task 502.

Figure 7:
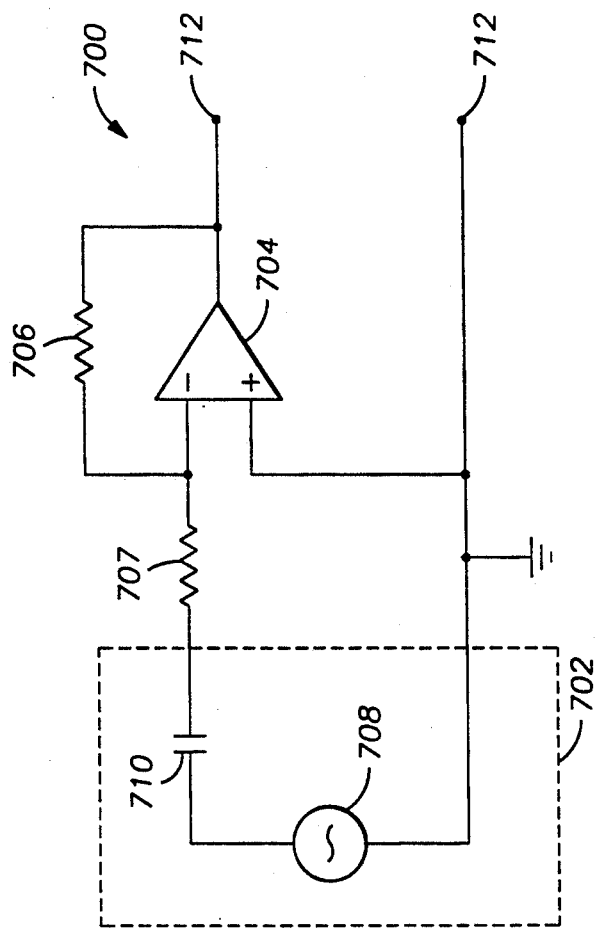
FIG. 7 is an electrical schematic diagram illustrating a voltage amplifier in accordance with the present invention.
Figure 6:
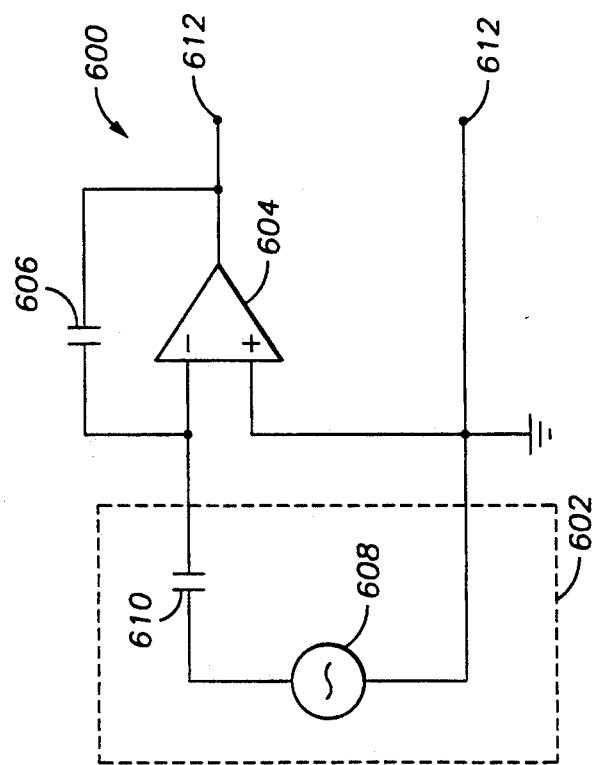
FIG. 6 is an electrical schematic diagram illustrating a capacitive/charge amplifier in accordance with the present invention.

The measurements taken in tasks 502 and 506 are performed with either a capacitive/charge amplifier 600 or a voltage amplifier 700, shown in FIGS. 6 and 7 respectively. Application of the voltage pulse of step 504 has the effect of modifying both the pressure sensitivity and the capacitance of the hydrophone 100. Therefore, if the hydrophone 100 is to be employed in a hydrophone array whose output will be directed to an amplifier that is sensitive to the capacitance of the hydrophone 100, then the capacitive/charge amplifier 600 is utilized in tasks 502 and 506. However, if the hydrophone 100 is to be employed in a hydrophone array whose output will be directed to an amplifier (e.g., an oscilloscope or other voltage amplifier) that is not responsive to the capacitance of the hydrophone 100, then the voltage amplifier 700 is utilized in tasks 502 and 506.

The capacitive/charge amplifier 600 includes a hydrophone 602 electrically connected to the inverting input of an operational amplifier 604. A feedback capacitor 606 is electrically interposed between the output and the inverting input of the amplifier 604. The hydrophone 602 is modeled as a power source 608 and a capacitor 610. The output of the amplifier 600 is provided across terminals 612. The output of the amplifier 604 is equal to the ratio of the capacitor 610 to the capacitor 606, multiplied by the opposite of the voltage produced by the source 608, as shown below in equation 1.0.

$$\text{amplifier output} = \frac{\text{capacitance 610}}{\text{capacitance 606}} (-1)(\text{voltage of source 608}) \qquad [1.0]$$

Thus, by changing the ratio of the capacitors 606, 610, adjustment is made to the output of the amplifier 600, and, in effect, to the pressure sensitivity of the circuit 600.

The voltage amplifier 700 includes a hydrophone 702 electrically connected to the non-inverting input of an operational amplifier 704. A feedback resistor 706 is electrically interposed between the output and the non-inverting input of the amplifier 704. An input resistor 707 is electrically interposed between the hydrophone 702 and the inverting input of the amplifier 704. The hydrophone 702 is modeled as a power source 708 and a capacitor 710. The output of the amplifier 700 is provided across terminals 712. The output of the amplifier 704 is equal to the ratio of the resistor 706 to the resistor 707, multiplied by the opposite of the voltage produced by the source 708, as shown below in equation 2.0.

$$\text{amplifier output} = \frac{\text{resistance 706}}{\text{resistance 707}} (-1)(\text{voltage of source 708}) \qquad [2.0]$$

Thus, by changing the ratio of the resistors 706, 707, adjustment is made to the output of the amplifier 700, and, in effect, to the pressure sensitivity of the circuit 700. Unlike the capacitive/charge amplifier 600, the output voltage of the voltage amplifier 700 is independent of the capacitance 710 above its low frequency cut-off.

Testing of the Invention

Figure 8A:
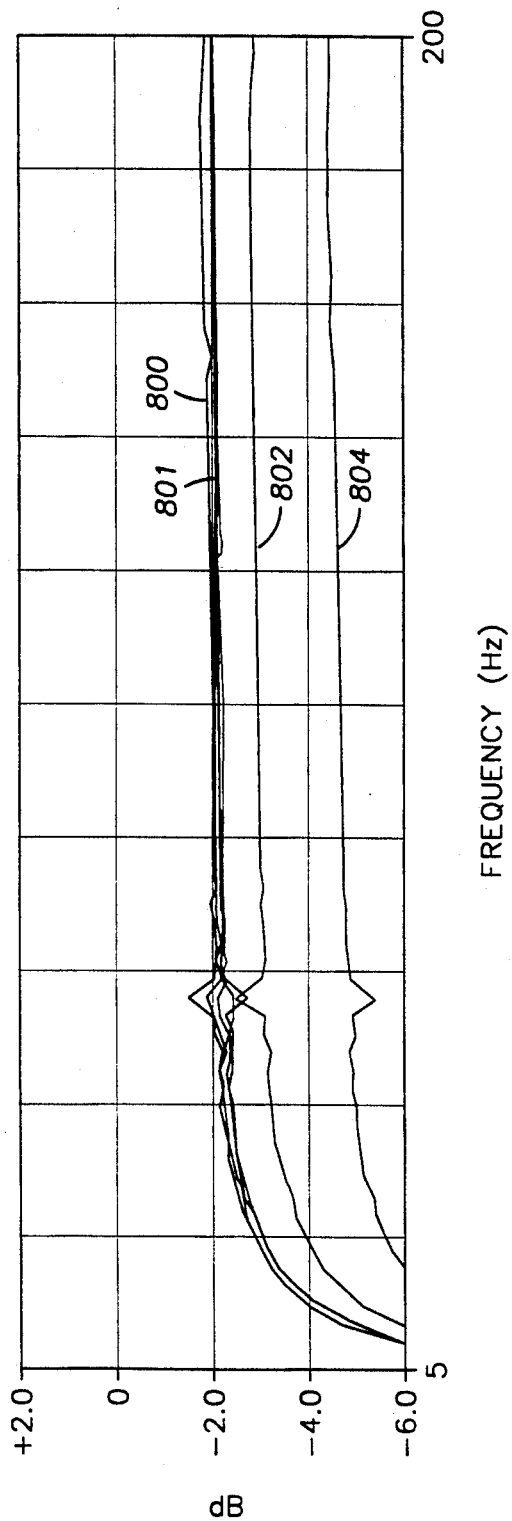
FIG. 8A is a graph showing normal amplitude characteristics of a hydrophone after successive pulses in accordance with the present invention.

The method of the present invention was tested repeatedly in a laboratory, using a charge amplifier such as the amplifier 600. The results from two representative tests are shown in FIGS. 8A-8B and 9A-9B. In each test, rectangular voltage pulses of varying levels were applied to a polarized test crystal, after each pulse, a spectrum analyzer was utilized to measure the amplitude and phase of the crystal's output over a range of input frequencies from 5 Hz to 200 Hz. The voltage waveforms of FIG. 8A represent a comparison of the test crystal to an arbitrarily selected reference crystal, wherein the test crystal is successively pulsed and the reference crystal is not pulsed. The vertical axis indicates a comparison index calculated by inputting the crystal outputs, for a particular frequency of input pressure, into equation 3.0 below.

$$20 \log_{10} \frac{\text{voltage output by test crystal}}{\text{voltage output by reference crystal}} \qquad [3.0]$$

Figure 8B:
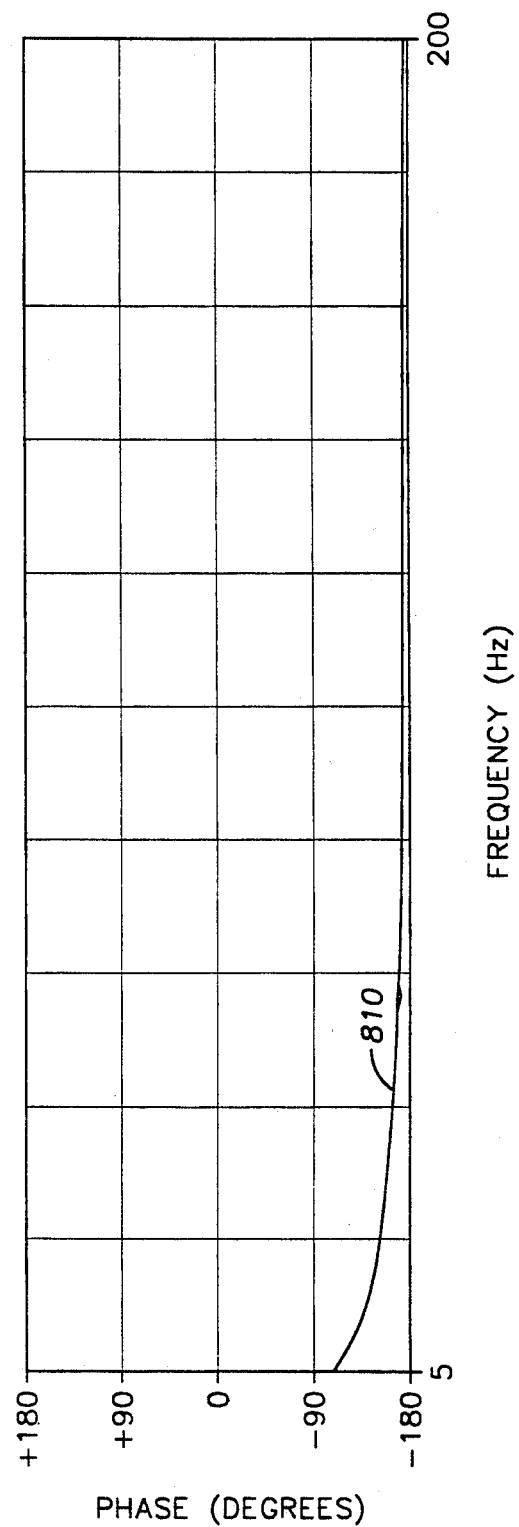
FIG. 8B is a graph showing normal phase characteristics of a hydrophone after successive pulses in accordance with the present invention.

FIG. 8A shows how the hydrophone's output voltage successively decreases after successive rectangular voltage pulses are applied. In particular, after a 600 V pulse is crystal, the comparison index decreased from a curve 800 to a curve 801. Likewise, further pulses of 700 V, 800 V, and 825 V reduced the comparison index from the curve 801 to a curve 802, and then 804. In FIG. 8B, phase curves 810 corresponding to the successive voltage pulses are shown; these curves 810 overlap each other, indicating that the phase of the crystal being tested did not change throughout the successive voltage pulses.

FIG. 9A shows a sequentially decreasing comparison index of a different test crystal than FIG. 8A-8B. In FIG. 9A, rectangular voltage pulses of 400, 600, 800, and 1000 V were successively applied, resulting in comparison index curves 900, 902, 904, and 906. In FIG. 9B, phase curves 910 corresponding to the 400, 600, and 800

V pulses are shown; these curves 910 overlap each other, indicating that the phase of the test crystal did not change as a result of the voltage pulses 900, 902, 904, and 906. However, when a voltage pulse of 1000 V was applied, the phase changed to 0°, as shown by phase curve 912 in FIG. 9B.

Conclusion

The present invention has a number of advantages over prior methods. In particular, the invention facilitates the production of hydrophones with highly precise outputs. As a result, streamers utilizing hydrophones produced in accordance with the present invention may be more accurately calibrated; in addition, they provide more accurate data. Also, unlike prior arrangements, the present invention does not require inclusion of additional circuitry to normalize hydrophones, outputs. Furthermore, since each hydrophone may be adjusted individually, no hydrophone is unusable; the present invention therefore avoids the waste encountered with prior methods.

While there have been shown what are presently considered to be preferred embodiments of the invention, it will be apparent to those skilled in the art that various changes and modifications can be made herein without departing from the scope of the invention as defined by the appended claims.

What is claimed is:

1. A method of precisely fixing the output sensitivity of a polarized crystal hydrophone to a selected sensitivity level, comprising the steps of:
   (a) applying a pressure input to the hydrophone while measuring an output produced by the hydrophone;
   (b) selecting an input voltage of a first polarity be applied to the hydrophone;
   (c) applying the selected input voltage to the hydrophone; and
   (d) repeating steps (a) and (b) until the hydrophone manifests a selected sensitivity level.

2. The method of claim 1, wherein the pressure input of step (a) comprises a sound wave.

3. The method of claim 1, wherein the input voltage of step (b) is applied across the crystal.

4. The method of claim 1, wherein the output of step (a) is measured across a pair of leads, one lead being connected to the crystal and the other lead being connected to a diaphragm that is affixed to the crystal.

5. The method of claim 1, wherein the output comprises the charge sensitivity of the hydrophone.

6. The method of claim 1, wherein the output comprises the voltage sensitivity of the hydrophone.

7. The method of claim 1, wherein the input voltage comprises a pulse of voltage.

8. The method of claim 1, wherein step (a) further includes a step of measuring the phase of the hydrophone, and aborting the method if the phase of the hydrophone has reversed.

9. The method of claim 1, wherein step (a) further includes a step of determining whether the hydrophone has been de-polarized, and if the hydrophone has been de-polarized, applying a voltage of a second polarity opposite the first polarity, to the hydrophone to re-polarize the hydrophone.

10. The method of claim 9, wherein the step of determining whether the hydrophone has been de-polarized comprises the steps of measuring the phase of the hydrophone while a pressure input is applied to the hydrophone and determining whether the phase of the hydrophone has reversed.

11. The method of claim 1, wherein the measurement of step (a) is performed using a charge amplifier.

12. The method of claim 1, wherein the pressure input comprises a sound wave.

13. The method of claim 1, wherein the measurement of step (a) is performed using a voltage amplifier.

14. The method of claim 1, wherein step (b) comprises the step of selecting the amplitude of the input voltage to most effectively achieve the selected sensitivity level.

15. The method of claim 1, wherein the input voltage comprises a rectangular wave.

16. A method of manufacturing a crystal hydrophone having a selected output sensitivity, comprising the steps of:
   (a) assembling a hydrophone that includes a diaphragm, a crystal polarized with a first polarity and conductively connected to the diaphragm, a first lead connected to the crystal, a second lead connected to the diaphragm and a housing that cooperates with the diaphragm to enclose the crystal;
   (b) applying a pressure input to the hydrophone while measuring an output across the leads;
   (c) if the measured output indicates that the selected output sensitivity has not been achieved, applying an input voltage signal of a second polarity opposite the first polarity to the leads; and
   (d) repeating steps (b) and (c) until the hydrophone manifests the selected output sensitivity.

17. The method of claim 16, wherein the pressure input of step (b) comprises a sound wave.

18. The method of claim 16, wherein step (c) further includes the following steps:
   (1) determining whether the hydrophone has been de-polarized; and
   (2) if the hydrophone has been de-polarized, applying an input voltage signal of the first polarity across the crystal to re-polarize the hydrophone.

19. The method of claim 18, wherein step (1) comprises the step of measuring the phase of the hydrophone while a pressure input is applied to the hydrophone, and determining whether the phase of the hydrophone has reversed.

20. The method of claim 16, wherein the measurement of step (c) is performed using a charge amplifier.

21. The method of claim 16, wherein the measurement of step (c) is performed using a voltage amplifier.

22. The method of claim 16, wherein the voltage signal comprises a rectangular wave.

23. A method of adjusting the polarization of a polarized crystal hydrophone, comprising the steps of (a) selecting a voltage signal sufficient to reduce the hydrophone's polarization, wherein the voltage signal is opposite in polarity to the polarization of the hydrophone, and (b) applying the selected voltage signal to the hydrophone.

24. The method of claim 23, wherein the voltage signal comprises at least one pulse of voltage.

25. The method of claim 24, further including the steps of repeating steps (a) and (b) as necessary to arrive at a selected level of polarization.

* * * * *